United States Patent [19]

Manabe et al.

[11] Patent Number: 4,484,118
[45] Date of Patent: Nov. 20, 1984

[54] METHOD AND APPARATUS FOR MEASURING A WORKPIECE

[75] Inventors: Takao Manabe, Shizuoka; Fumio Kamahora, Susono; Tetsu Yoshida, Numazu; Masakazu Kanemoto, Gotenba, all of Japan

[73] Assignee: Toshiba Kikai Kabushiki Kaisha, Tokyo, Japan

[21] Appl. No.: 384,278

[22] Filed: Jun. 2, 1982

[30] Foreign Application Priority Data

Aug. 29, 1981 [JP] Japan .................. 56-135998
Oct. 7, 1981 [JP] Japan .................. 56-159912

[51] Int. Cl.³ .......................................... G05B 13/00
[52] U.S. Cl. ........................... 318/561; 318/570; 318/603; 318/652
[58] Field of Search ............ 318/561, 567, 569–573, 318/590, 592, 600, 601, 603, 638, 652

[56] References Cited

U.S. PATENT DOCUMENTS

| | | | |
|---|---|---|---|
| 3,646,419 | 2/1972 | Holy et al. | 318/572 X |
| 4,134,053 | 1/1979 | Klinger | 318/561 |
| 4,195,250 | 3/1980 | Yamamoto | 318/561 |
| 4,266,172 | 5/1981 | Yamazaki | 318/578 |
| 4,355,273 | 10/1982 | DuVall | 318/592 X |
| 4,404,505 | 9/1983 | Swanson et al. | 318/561 |

Primary Examiner—B. Dobeck
Attorney, Agent, or Firm—Cushman, Darby & Cushman

[57] ABSTRACT

A numerical controlled machine tool provides a detector which produces a detecting signal when it is brought into contact or out of contact with a workpiece for measuring same. A driving device relatively moves the detector with respect to the workpiece, and a position detecting means for detecting the position of the detector. The numerical control device provides a signal corresponding to an amount by which the detector is moved with respect to the workpiece and causes the driving device to stop in accordance with the detecting signal. In operation, the numerical control device detects when the detector contacts with the workpiece while moving at a first speed, and applies a stop signal which is produced from a detecting signal given by the detector. The detector is then moved in a direction away from the workpiece at a second speed by a distance which is either larger or smaller than the distance by which the detector moved and stopped after the first detecting signal was produced. The detector is then further relatively moved either away from or towards, respectively, the workpiece at a third speed smaller than the first and second speeds. A detecting signal is again produced when the detector is brought into contact with the workpiece while moving at the third speed, and the contents of the position detecting device are read out when the detecting signal is produced while moving at the third speed is read out.

12 Claims, 9 Drawing Figures

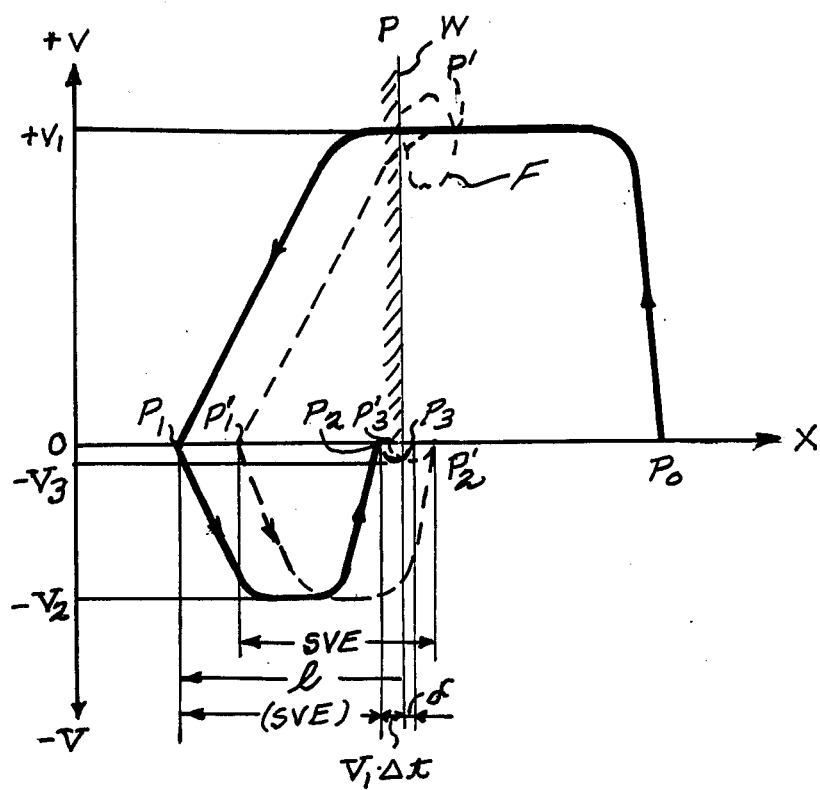
F I G. 6
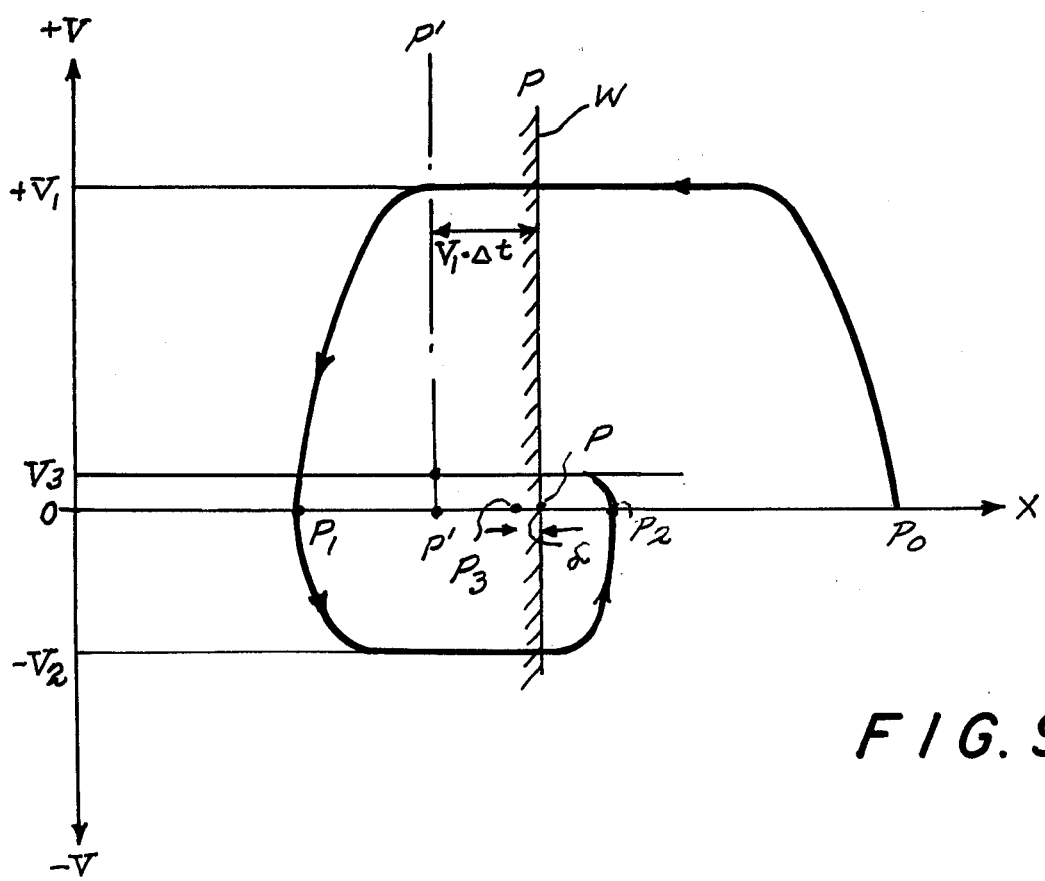
F I G. 9

METHOD AND APPARATUS FOR MEASURING A WORKPIECE

BACKGROUND OF THE INVENTION

The present invention relates to a method and apparatus for measuring a workpiece, more specifically to a method and apparatus for measuring a bore diameter or the position of a surface cut of a workpiece by relatively moving with respect to the workpiece a detector which contacts the workpiece.

DESCRIPTION OF THE PRIOR ART

Conventionally, when an automatic measuring function is to be added to a machine tool, it is necessary, where a detector of a contact type is employed, to read out the value of a coordinate scale. Such an arrangement, for example, may use a transducer known under the trademark "INDUCTSYN", a resolver, and so on, which is mounted on the machine and responds to a contact signal which is generated when the detector is brought into contact with a workpiece to be measured.

Since such a signal is produced while the machine is moving for detection, if there is a delay in a signal transmitting system, for example, a delay of the electric signal or a delay for discriminating the contact signal when it is taken into a calculation processing unit, then coordinates of a point to which the machine has overshot will be read. Such an error becomes greater as the feeding speed of the machine increases.

Thus, it should be apparent from the above that the feeding speed of the machine needs to be made as slow as possible in order to attain a high accuracy of measurement. If the feeding the machine is made slower, however, it takes too long a time to effect an intended measurement, and therefore, such a solution is disadvantageous in that it is not practical.

Additionally, in the case of a measuring method in which contact of a workpiece and a detector is involved, foreign substances such as, for example, chips and the like adhered to a portion of the workpiece at which it is measured, can cause a large error of measurement. In order to prevent such a problem, it may be necessary to remove foreign substances adhering to the workpiece before effecting an intended measurement. Such removing operations, however, are in fact difficult in an automatic measurement, particularly on a working machine.

SUMMARY OF THE INVENTION

Therefore, the present invention is directed to providing a method and apparatus for measuring a workpiece which solves the problems mentioned above, and which provides improved measuring efficiency without deteriorating the measuring accuracy. The measuring apparatus of the invention provides a detector producing a detecting signal when the detector is brought into or out of contact with the workpiece, and a moving device for relatively moving the detector with respect to the workpiece. A control device is provided for producing a signal corresponding to an amount by which the detector is moved with respect to the workpiece and for causing the moving device to stop the detector in accordance with the detecting signal. A position detecting device is provided for detecting the position of the detector.

The measuring method of the present invention comprises in accordance with one embodiment the steps of relatively moving the detector in a direction towards the workpiece at a first speed, and detecting that the detector contacts with the workpiece while the detector is moving at the first speed, a stop signal, which is produced by the control device in response to the detecting signal given from the detector, is applied to the moving device. After the detector stops in response to the stop signal, the detector is relatively moved in an opposite direction at a second speed by a distance which is smaller than the distance by which the detector moves and stops after the detecting signal is produced. Then, the detector is further relatively moved in this same opposite direction at a third speed smaller than the first or second speed, after the detector has moved by the distance at the second speed. Then, it is again detected when the detector is brought into contact with the workpiece while moving at the third speed, and the content of the position detecting device when the detecting signal is produced while moving at the third speed is read out.

BRIEF DESCRIPTION OF THE DRAWINGS

FIG. 6 shows a graphical representation of the velocity to position of a detector;

FIG. 9 shows another graphical representation of the present invention.

DETAILED DESCRIPTION OF THE INVENTION

Figure 1:
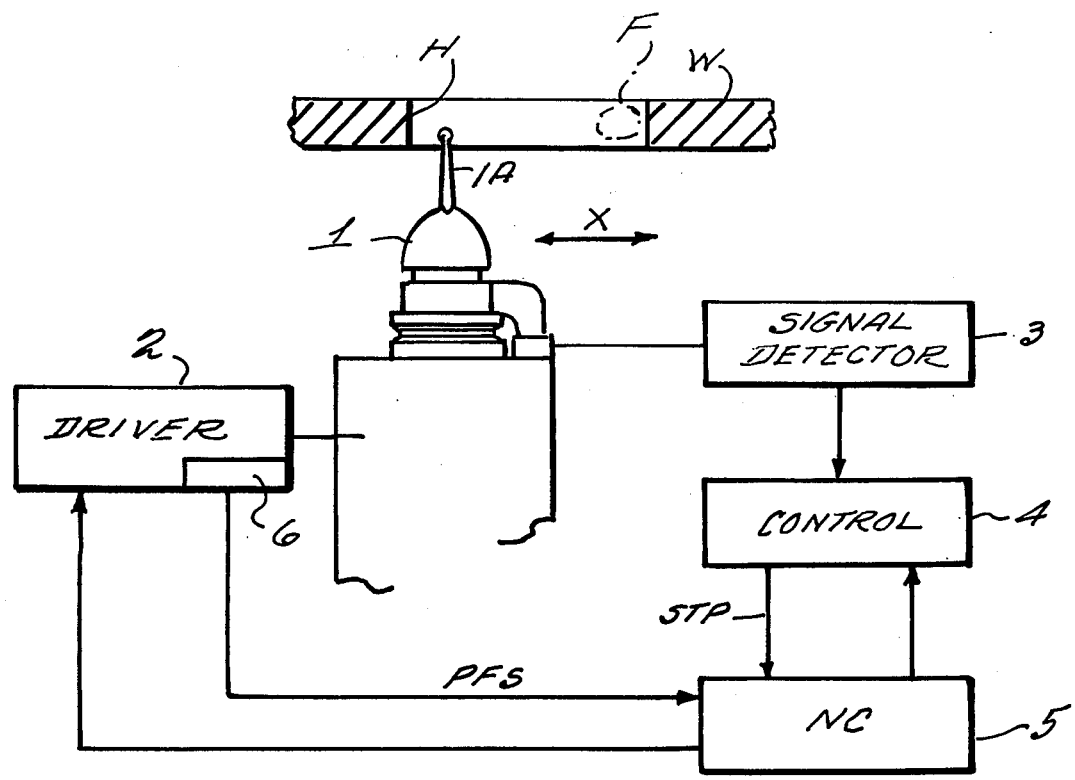
FIG. 1 illustrates one embodiment of a system of the present invention.

FIG. 1 illustrates the overall system of one embodiment of the invention. In this system, a contact detector 1 constituted from a piezo-electric element or the like is mounted, for example, on a machine tool and serves as a detecting means. The detecting means can be reciprocally moved by operation of a driving device 2 in a direction for measurement of a workpiece W, such as to measure the location of surface H. This direction will be hereinafter referred to as an "x direction". The detector 1 has at an end thereof a probe 1A adapted to contact with the workpiece W and provide a detection signal from a signal detecting circuit 3 to a control portion 4 while the probe 1A is held in contact with the workpiece W. The control portion 4 is an essential part of the present invention. Connected to the control portion 4 is a numerical control (NC) device 5 to which a detection command STP is input from the control portion 4. A measured value data representative of a current position of the detector 1 (a Position Feedback Signal, hereinafter referred to as a PFS) is also input to the NC device 5 from a position detecting device 6 which is mounted on the driving device 2. The NC device 5 controls the driving device 2 in accordance with a prescribed procedure and outputs a measured value data as a measured value at the point of time at which it discriminates a detection signal produced when the probe 1A of the detector 1 is brought out of or into engagement with the workpiece W. In FIG. 1 there is illustrated in dashed lines a foreign matter or substance F which may be present on the workpiece W.

Figure 2:
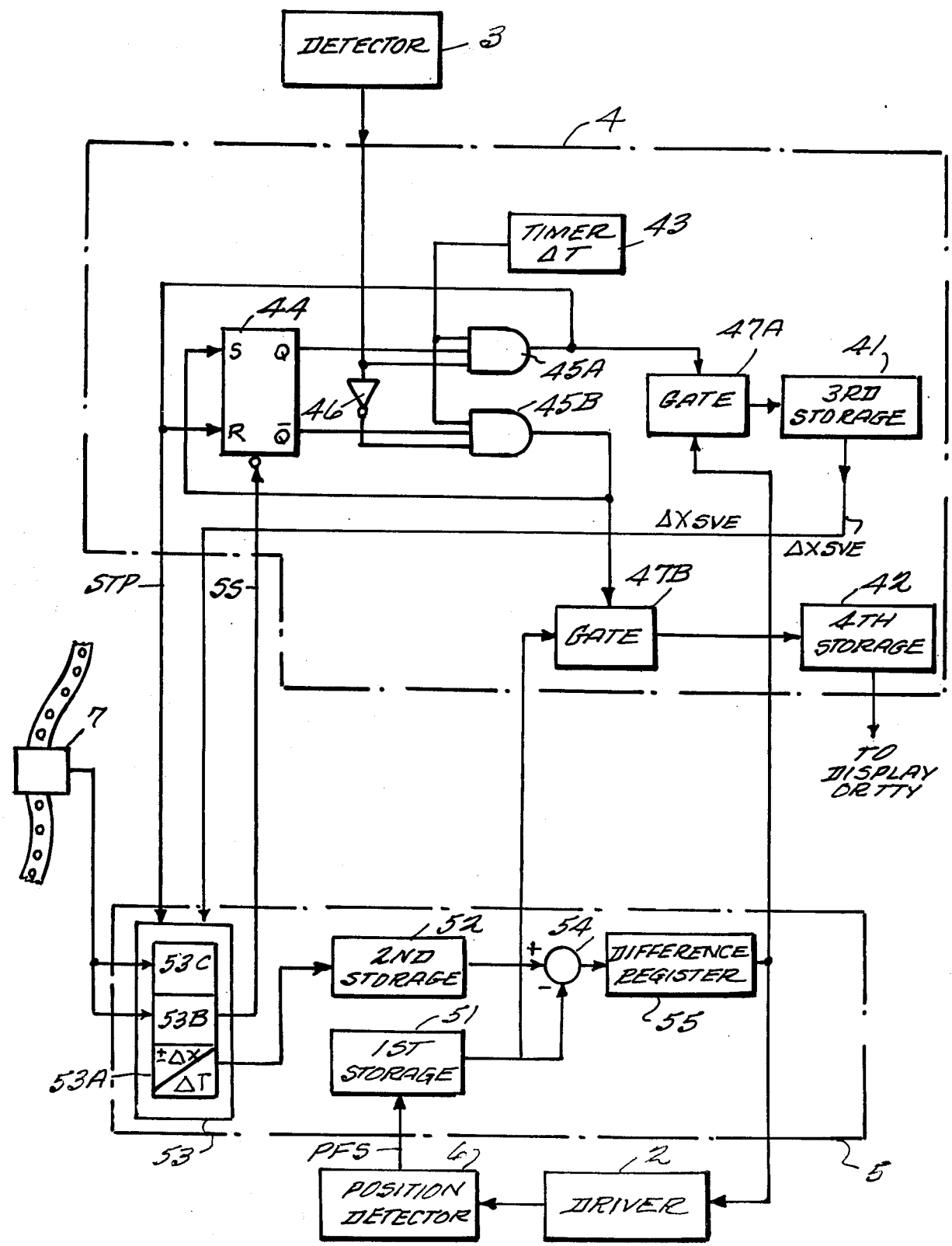
FIG. 2 illustrates a circuitry diagram of one embodiment of the present invention.

FIG. 2 illustrates a circuitry diagram for the control portion 4 and the NC device 5. As shown in FIG. 2, the NC device 5 includes first and second storage means 51 and 52, an NC main portion 53, an adder portion 54, and a difference register 55. The first storage means 51 is constituted from a feedback counter adapted to store a measured value data from the position detecting device 6 in a sequence. The second storage means 52 is a command counter and is adapted to receive movement command values ($\Delta x/\Delta T$) provided from an interpolation calculating portion 53A of the NC main portion 53 after each predetermined interval of time $\Delta T$. The difference between the outputs of the first and second storage means 51 and 52 is provided to the difference register 55 through the adder portion 54 as a so-called servo error (SVE) at each time interval $\Delta T$. The adder portion 54 and the difference register 55 are constituted each as a reversible counter. The NC main portion 53 includes, in addition to the interpolation calculating portion 53A, a sequencing portion 53B for dealing with sequence information, a decoding portion 53C for decoding data given from a tape reading portion 7, and may include other portions as known in the numerical control art. Further, the output of difference register 55 is provided to the driving device 2 which contains a digital to analog (D/A) converting portion.

The control portion 4 includes third and fourth storage means 41 and 42; a timer circuit 43 which outputs a clock signal after each lapse of a predetermined interval of time $\Delta T$; a flipflop 44; and an AND circuit 45A which receives a clock signal from the timer circuit 43, a signal from the set output terminal Q of the flipflop 44, and a detection signal provided from the signal detecting circuit 3. Another AND circuit 45B is provided, which receives a signal from the reset output terminal Q of the flipflop 44 and an inverted signal of the detection signal from an inverter 46. A gating circuit 47A is provided for enabling the difference between a measured value data of first storage means 51 and a command value data of second storage means 52 to be taken into third storage means 41 when the output of the AND circuit 45A is switched to an H level (logical value = 1); and another gating circuit 47B is switched to an H level, into fourth storage means 42 for providing the measured value data, for example, to a display device or the like. Control portion 4 thus controls the driving circuit 2 according to a prescribed procedure.

Flipflop 44 is reset when the output of AND circuit 45A is switched into the H level whereas it is set when the output of AND circuit 45B is switched into the H level. Further, flipflop 44 can initially be brought into the set condition by a command signal SS from sequence portion 53B of NC main portion 53.

NC main portion 53 is supplied with a signal from AND circuit 45A as a signal STP for inhibiting sending a command value $\Delta x/\Delta T$ to second storage means 52, and also with the value of third storage means 41 transferred already through gating circuit 47A as a signal $\Delta X_{SVE}$ for causing probe 1A to be moved in an opposite direction after the value of difference register 55 is once cleared to zero.

Figure 3:
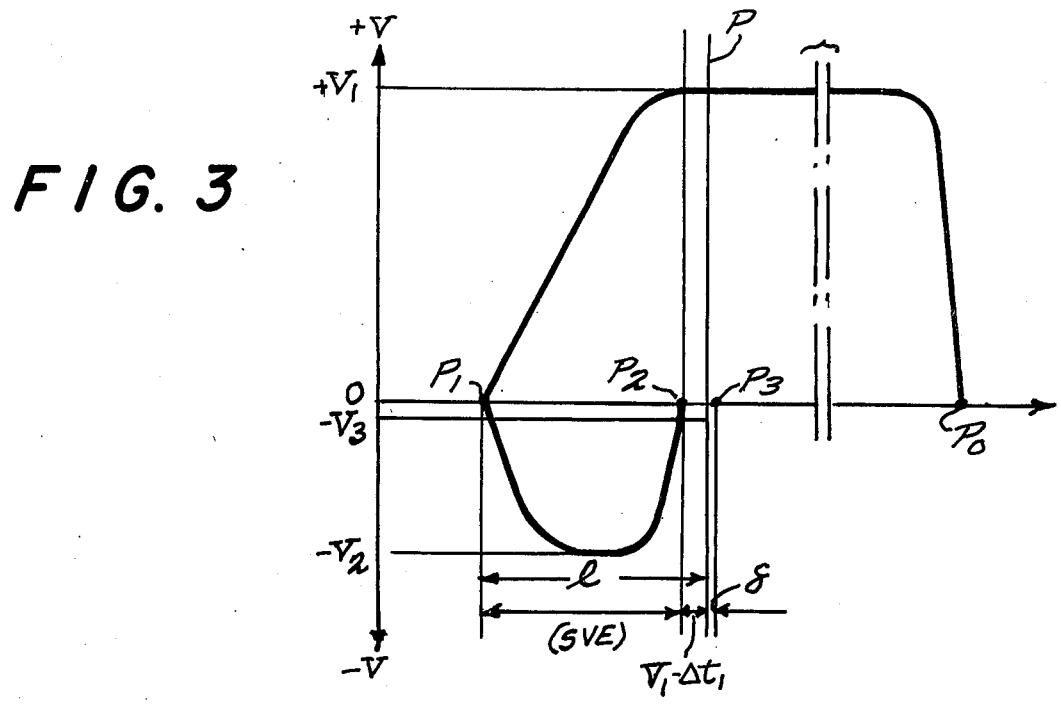
FIG. 3 shows a graphical representation of the velocity to position of a detector.

Operation of this embodiment will now be described with reference to FIGS. 3 and 4. First, after flipflop 44 is set for initialization, detector 1 is moved in response to a command from NC main portion 53 by driving device 2 at a speed $V_1$ from a reference position $P_0$ corresponding to a measurement starting point (see FIG. 3), whereupon a position feedback signal PFS is provided from the position detecting device 6 mounted on driving device 2. The measured data are thus sequentially stored in first storage means 51.

In the meantime, when probe 1A reaches a position P at which it contacts with the workpiece W while detector 1 is being moved at the speed $V_1$, a detection signal (contact signal) of the H level is provided to AND circuit 45A of control portion 4 from the signal detecting circuit 3. Since AND circuit 45A is thereupon held in a condition in which it is supplied with a signal of the H level from the set output terminal Q of flipflop 44 in its set condition, it provides an output of the H level when a clock signal is supplied thereto from timer circuit 43. The output of the H level from AND circuit 45A is provided to flipflop 44 as a resetting signal to reset flipflop 44 and also to the NC main portion 53 as a stopping signal STP to inhibit sending of the command value $\Delta x/\Delta T$ to second storage means 52. Further, the output of the H level from AND circuit 45A is also provided to gating circuit 47A to open gating circuit 47A. Upon opening of gating circuit 47A, the difference (servo error amount SVE) between the measured value data of first storage means 51 and the command value data of second storage means 52, that is, the output value of difference register 55, is stored in third storage means 41. After that, detector 1 is moved to and stopped at a position $P_1$ at which the servo error amount becomes zero (see FIG. 3).

The overshoot l of detector 1 before it stops after probe 1A of the detector 1 has been brought into contact with the workpiece W to thereby output a corresponding detection signal is represented by an equation:

$$l = \text{servo error amount} + V_1 \cdot \Delta t_1 \tag{1}$$

where $\Delta t_1$ is the period of time before a clock signal is provided from timer circuit 43 after probe 1A of detector 1 has been brought into contact with the workpiece W to thereby provide a detection signal or in other words, a time delay before control portion 3 descriminates the detection signal, and is smaller than at least the period T of the clock signal.

Then, detector 1 is moved at a relatively high speed $V_2$ in the opposite direction from its stopped position $P_1$ to another position $P_2$ by a distance equal to the servo error amount stored in third storage means 41, and is further moved in this direction from latter position $P_2$ at a low or very low speed $V_3$.

During the movement of detector 1 at the speed $V_3$, when probe 1A of detector 1 reaches a position at which it is brought out of contact with the workpiece W, a detection signal of the L level (an out-of-contact signal) is provided from the signal detecting circuit 3 to inverter 46 in control portion 4 at which it is inverted to be provided to AND circuit 45B. Since AND circuit 45B is then in a condition in which it is supplied with a signal of the H level from the reset output terminal Q of flipflop 44 in the reset condition, it produces an output signal of the H level when it is supplied with a clock signal from timer circuit 43. Due to this output of the H level from AND circuit 45B, gating circuit 47B is opened so that the measured value data of first storage means 51 thereupon is stored into fourth storage means 42 and simultaneously flipflop 44 is set back to its initial condition. After that, the data stored in the fourth storage means 42 can be displayed, for example, on a display device or the like as the pertinent measured value.

Here, the overshoot or error $\delta$ of detector 1 within a period of time $\Delta t_2$ ($<\Delta t$) after probe 1A of the detector 1 has been brought out of contact with the workpiece W to output a corresponding detection signal and before the detection signal is discriminated is represented by an equation:

$$\delta = V_3 \cdot \Delta t_2 \qquad (2)$$

Accordingly, if the speed $V_3$ is made small, then the error can be made significantly small. Further, if it is assumed that the speed $V_2$ is a high speed employed for feeding since it is independent of the intended measurement and that the speed $V_1$ is a permissible highest speed of detector 1 since there may be some error permissible in the speed $V_1$, since the distance of movement of detector 1 at the speed $V_3$ is limited to a small range even if the speed $V_3$ is such a low or very low speed, it is possible to raise the efficiency of the measurement without having a bad influence on the accuracy of the measurement.

For example, assuming that conditions are such that the distance $\overline{P_0P}$ from the reference position $P_0$ of detector 1 to the position at which detector 1 is contacted with the workpiece W is 10 mm., and that $\Delta T = 5$ msec.:

(1) if all of the speeds $V_1$, $V_2$ and $V_3$ are high such as 2,000 mm./min., the error in measurement will be 166 $\mu$m. at the largest although the time for measurement is less than one second;

(2) otherwise, if all of the speeds $V_1$, $V_2$ and $V_3$ are low such as 10 mm./min., the time for measurement will become longer than one minute while the error in measurement will be about 0.8 $\mu$m.; and (3) further, if the speed $V_1$ is 2,000 mm./min., the speed $V_2$ 1,000 mm./min. and the speed $V_3$ 10 mm./min., then the accuracy in measurement will be same as in the second case above and thus about 0.8 $\mu$m. while the time for measurement will be about 1.4 second if the overshoot is assumed to be 2 mm.

Accordingly, if the feeding speed is controlled in the third conditions above, then the time for measurement can be significantly reduced without deteriorating the accuracy in measurement.

Figure 4:
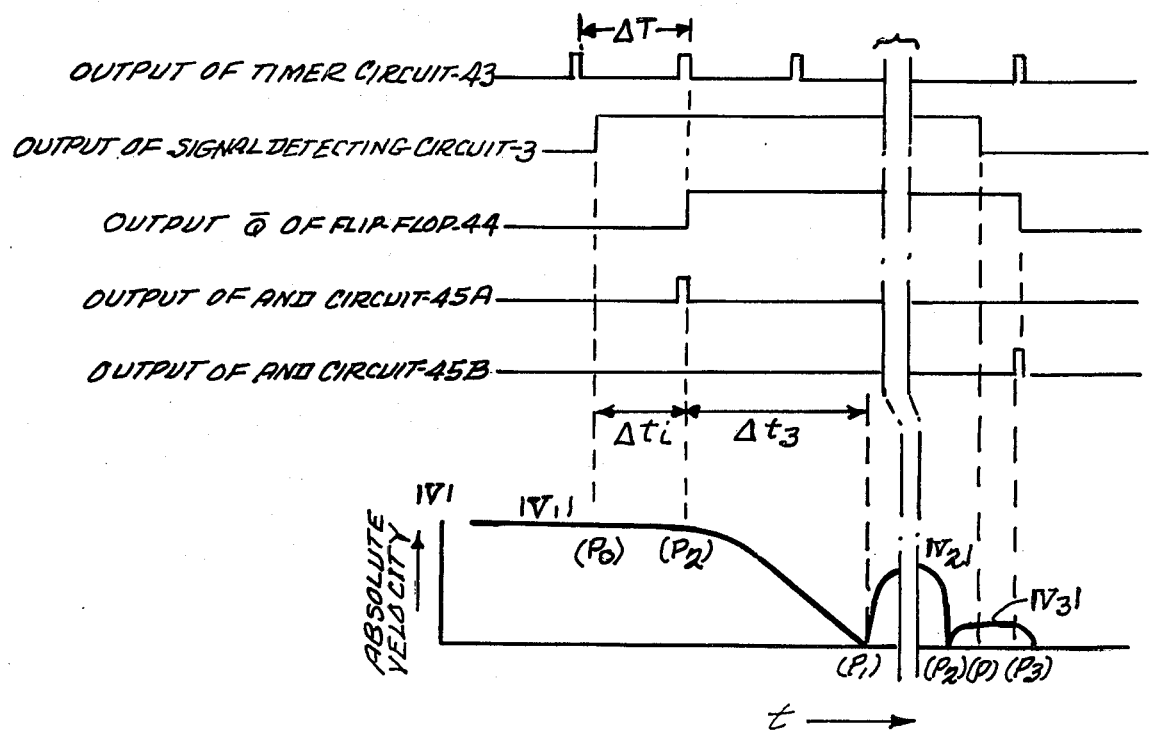
FIG. 4 shows a waveform timing chart of various signals on the circuitry diagram shown in FIG. 3.

In the upper part of FIG. 4, there are illustrated time charts of waveforms of various signals of control portion 4 while in the lower part of FIG. 4 there are illustrated changes in the absolute value of the speed V of detector 1 with the time axis of abscissa taken in common.

Although the diameter of a contact end of probe 1A has not been taken into consideration in the foregoing description, correction must actually be made for the diameter of such probe contact end. It is also to be noted that such measurement can be applied for measurement of the diameter of a hole, for measurement of the center of a hole, for automatic centering, for drilling concentrical holes, and so on.

It is also to be noted that, although in the embodiment of FIG. 2 control portion 4 is shown as constituted from logic circuits as a hardware, recent numerical control devices of a CNC (Computerized Numerical Control device) type eliminates the necessity of constituting control portion 4 with concrete logic circuits whereby such logic circuits can be substituted by a group of program commands.

In a CNC device, such a group of program commands are read out and executed as a subprogram in response to an interruption signal provided after lapse of each $\Delta T$.

The main steps of the program commands when the present invention is used with a CNC device will now be described. When an interruption signal is provided during movement of the machine (the detector) at the speed $V_1$, whether there is an output of signal detecting circuit 3 or not is checked, and if the output of the signal detecting circuit is "present", the interpolation calculation within the CNC device is stopped and the servo error amount at this instant is stored in a register (which corresponds to the third storage means 41 in the above described embodiment). The machine is stopped after its movement by the servo error amount, and the contents of the register are provided to the driving system of the machine as command values to move the machine at the speed $V_2$ in a direction opposite to the direction of its preceding movement at the speed $V_1$.

Subsequently, upon termination of the movement of the machine by the servo error amount, a command to move the machine at the low (very low) speed $V_3$ is provided. During this movement at the low speed $V_3$, it is checked that the output of the signal detecting circuit 3 is switched from "present" to "absent", and if the "absent" is detected, the supply of the command pulses ($\Delta x/\Delta T$) is stopped. Then, the contents of the first storage means at this instant are transferred to the register which corresponds to the fourth storage means 41 in FIG. 2, and where required, it is commanded to indicate such values of the contents with a display.

While main program commands for a CNC device have been described above, a programmer skilled in the art could easily make a series of programs suitable for practicing the invention for operation in response to an interruption command by referring to FIG. 2.

Further, while in the above described embodiment the detecting means is mounted on a machining center, the present invention is not limited to such constitution and can be applied, for example, to an NC horizontal boring machine and so on, and further, it can be applied not only to machine tools but also to conventional measuring apparatus such as, for example, a coordinate measuring device.

FIG. 5 to FIG. 8 shows another embodiment of the present invention, which is suitable in case that some foreign substance is adhered on the surface to be measured.

Figure 5:
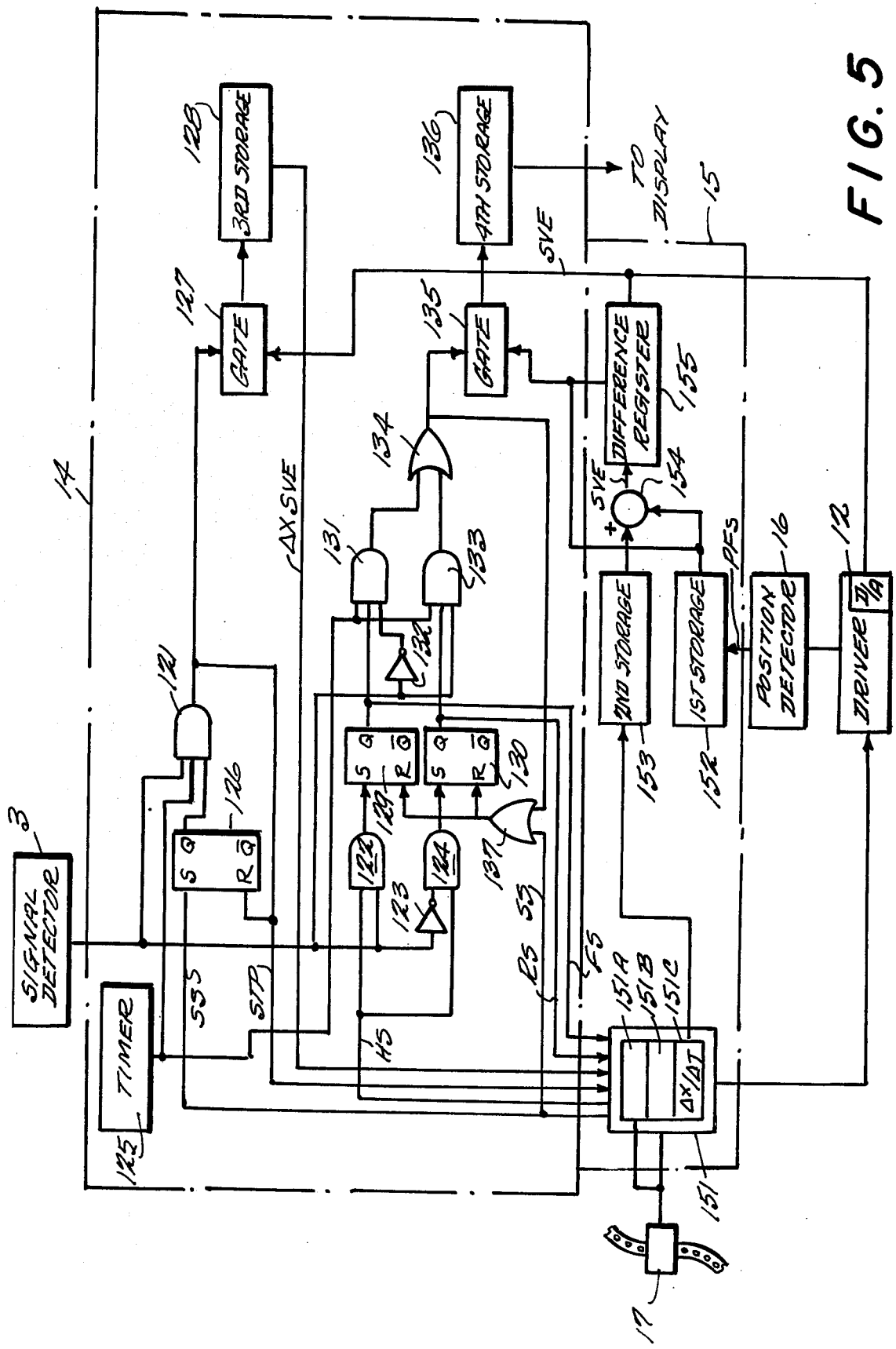
FIG. 5 illustrates a circuitry diagram of another embodiment of the present invention.

FIG. 5 illustrates circuitry constructions for a control portion 14 and a NC device 15. NC device 5 includes an NC main portion 151 for performing predetermined calculations, first and second storage means 152 and 153, an adding portion 154, and a difference register 155. NC main portion 151 includes a sequencing portion 151A which deals with sequence information, a decoding portion 151B for decoding data from a tape reader portion 17, an interpolation calculation portion 151C which outputs a movement command value ($\Delta x/\Delta T$) after each interval of time, and may include other portions commonly found in NC devices. A first storage means 152 is constituted from a feedback counter adapted to store therein, in order, the measured value data sequentially input from a position detecting device 16. A second storage means 153 is constituted from a command value counter adapted to store a movement command value $\Delta x/\Delta T$ output after each interval of time from interpolation calculating portion 151A of main portion 151. A difference of the contents between first and second storage means 152 and 153 is applied as a servo error SVE to a difference register 155 through addition portion 154. This servo error SVE is then provided to a driving device 12 which contains a D/A converter portion therein. Adding portion 154 and difference register 155 can each be constituted as a reversible counter.

A control portion 14 includes two AND circuits 121 and 122 adapted to receive a detection signal from a signal detecting circuit 13 and another AND circuit 124 adapted to receive the detecting signal inverted by an inverter 123. AND circuit 21 receives, in addition to the detecting signal, clock signals which are output from a timer circuit 125 after each predetermined fixed interval of time $\Delta T$ and a signal from a set output terminal Q of the flipflop 126. An output of AND circuit 21 is applied to flipflop 26 to reset flipflop 26, to the NC main portion 151 as a stop command signal STP for stopping sending of a command value $\Delta x/\Delta T$ from NC main portion 151, and to a gate circuit 127. Gate circuit 127 is opened when the output of AND circuit 121 is switched into the H level (logical value 1) so that the servo error SVE of difference register 155 is enabled to be taken into a third storage means 128. Data taken into third storage means 128 is provided to NC main portion 151 as a signal $X_{SVE}$ for moving detector 11 in the opposite direction when difference register 155 is once reset into zero.

AND circuits 122 and 124 receive, in addition to the signal from the signal detecting circuit 13, a discrimination control signal HS which is output from NC main portion 151 after an operation thereof in response to the signal $\Delta X_{SVE}$. Output terminals of AND circuits 122, 124 are connected to set input terminals S of flipflops 129, 130, respectively. A signal from a set output terminal Q of flipflop 129 is input to NC main portion 151 as a forward feed command signal FS for causing driving device 12 to drive detector 11 to move in a direction away from the workpiece W. The same signal from flipflop 129 is provided to an AND circuit 131. The AND circuit 131 receives, in addition to the signal from flipflop 129, the detecting signal from the signal detecting circuit 13 inverted by an inverter 132, and clock signals from timer circuit 125. Meanwhile, a signal from a set output terminal Q of flipflop 130 is applied to NC main portion 151 as a reverse feed command signal RS for causing driving device 12 to drive detector 11 to move in a direction into contact with the workpiece W. The same signal from flipflop 130 is also provided to an AND circuit 133. AND circuit 133 receives, in addition to this signal from flipflop 130, a detection signal from signal detecting circuit 13 and clock signals from timer circuit 125.

Outputs from AND circuits 131, 133 are applied to a gate circuit 135 through an OR circuit 134. Gate circuit 135 is opened when an output of either one of AND circuits 131, 133 is switched into the H level so that data stored in first storage means 152 is taken into a fourth storage means 136. It is to be noted that flipflop 126 is initially preset into the set condition by an initialization command signal SS from sequence portion 151A of NC main portion 151. It is also to be noted that flipflops 129, 130 are reset respectively by the command signal SS applied from the sequence portion 151A of NC main portion 151 through an OR circuit 137 and by an output signal from OR circuit 134.

Figure 7:
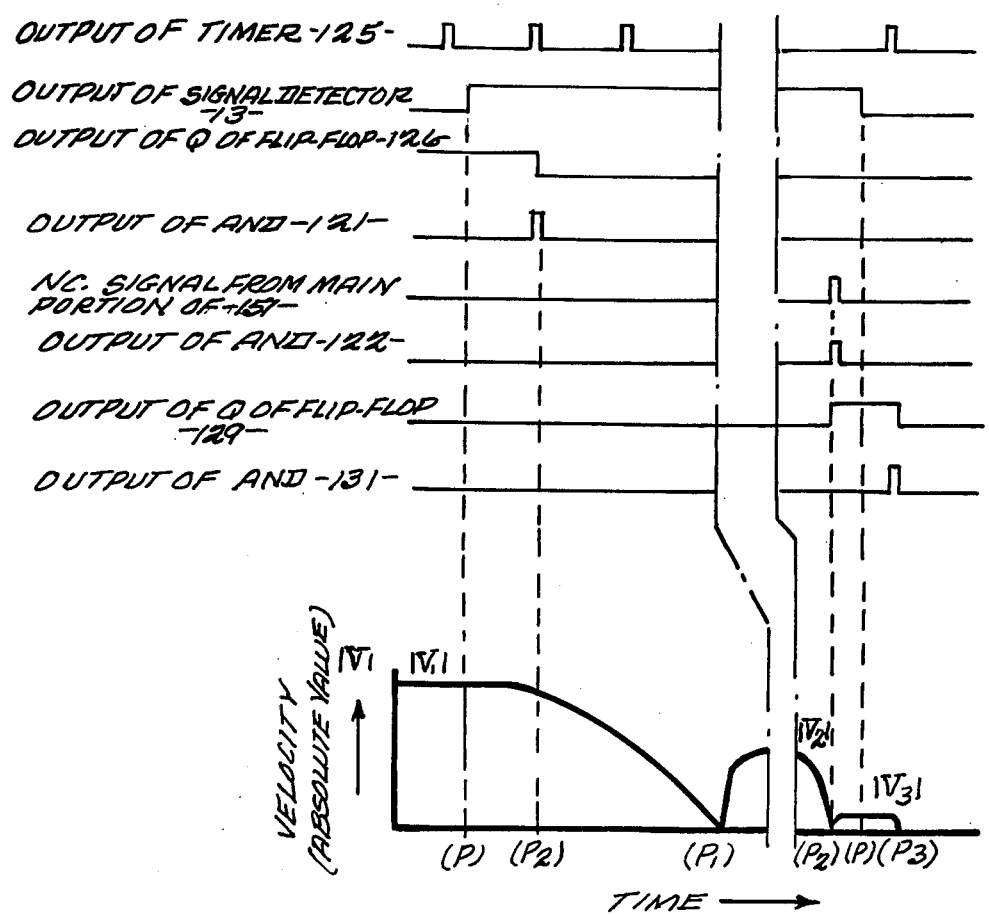
FIG. 7 and FIG. 8 show waveform timing charts of various signals on the circuitry diagram of the embodiment shown in FIG. 5.
Figure 8:
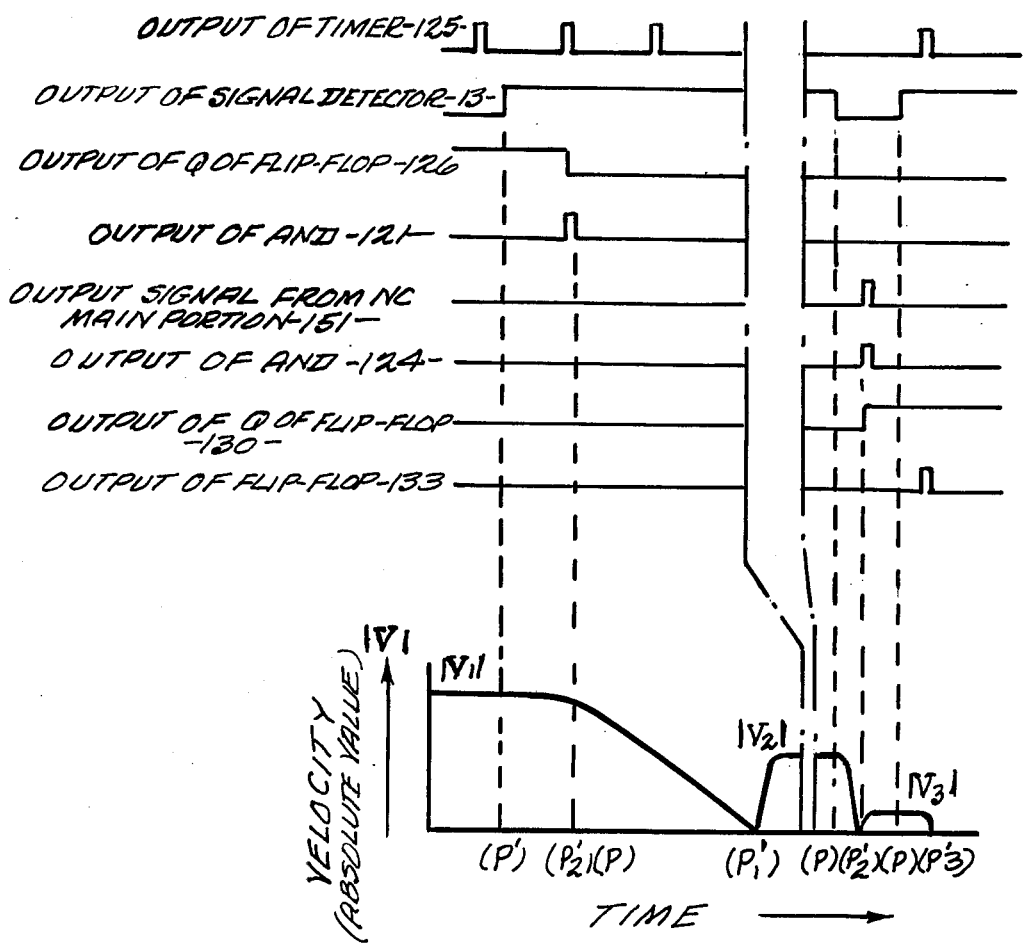

Operations of the present embodiment will now described by referring to FIGS. 6, 7 and 8. First, flipflop 126 is initialized into the set condition while flipflops 129, 130 are initialized into the reset condition by initialization command signal SS from sequence portion 151A of NC main portion 151. Then, by a command from NC main portion 151, driving device 12 is operated to move detector 11 at a speed $V_1$ from a reference position $P_0$ which is the starting point of the intended measurement (see FIG. 6). During this movement, position feedback signals PFS are produced sequentially from position detecting device 16 mounted on driving device 12 and such measured data or the position feedback signals PFS are sequentially stored in first storage means 152.

In the meantime, when the probe 11A comes into a position P in which it is contacted with the workpiece W during the movement of the detector 11 at the speed $V_1$, a detecting signal (contact signal) in the H level is provided from signal detecting circuit 13 to AND circuit 121 of control portion 14. If there should be a foreign matter F such as, for example, a chip, then, on a surface of the workpiece W to be measured, a detection signal in the H level would be provided to AND circuit 121 when probe 11A comes to a position P' in which it is brought into contact with the foreign matter F, or in other words, when probe 11A comes to a position short of the position in which it is brought into contact with the true surface to be measured. Since AND circuit 121 is in a condition in which it is supplied with a signal in the H level from the set output terminal of flipflop 126 in the set condition, it produces an output in the H level each time a clock signal is provided thereto from timer circuit 125. This output from AND circuit 121 in the H level resets flipflop 126 and at the same time it is applied to NC main portion 151 as a stop command signal STP. The NC main portion 151 stops, in response to the stop command signal STP, sending the command value $\Delta x/\Delta T$ from interpolation calculating portion 151C thereof to the second storage means 153. In addition, gate circuit 127 is opened by the output from AND circuit 121 in the H level. Thereupon, a difference between the measured value data of first storage means 152 (a servo error amount SVE), or the value of difference register 155 is stored into third storage means 128. After that, detector 11 is moved to and stopped at a position $P_1$ or $P_1'$ at which the servo error amount is reduced to zero (see FIG. 5).

Here, an overshoot amount l of detector 11 from when probe 11A of detector 11 is brought into contact with the workpiece W to output a detecting signal corresponding to it when detector 11 is stopped is represented by an equation:

$$l = \text{the servo error amount} + V_1 \cdot \Delta t_1 \quad (3)$$

where $\Delta t_1$ is an interval of time from when probe 11A of detector 11 is brought into contact with the workpiece W to output a corresponding detection signal to when a clock signal is provided from timer circuit 125 or in other words, a delay of time until the detection signal is discriminated by control portion 14, $\Delta t_1$ being smaller than at least the period $\Delta T$ of the clock signals.

Then, detector 11 is moved at a relatively high speed $V_2$ in the opposite direction from its stopped position $P_1$ or $P_1'$ by a distance equal to the servo error amount stored in third storage means 128. When this movement stops, a discrimination command signal HS is provided to AND circuits 122, 124 of control portion 14 from NC main portion 151. AND circuits 122, 124 thereupon discriminate whether the detecting signal provided from signal detecting circuits 13 is in the H level or in the L level. Normally, if there is no foreign matter interposed between the workpiece W and probe 11A when probe 11A first outputs a contact signal, the detecting signal is in the H level, or in other words probe 11A is in a condition contacted with the workpiece W, due to the presence of a delay of time after probe 11A has been actually brought into contact with the workpiece W before control portion 14 discriminates such contact. On the other hand, if there is a foreign matter F interposed between the workpiece W and probe 11A, the detecting signal is in the L level, or in other words, probe 11A is in a condition in which it is out of contact with the workpiece W, since the foreign matter F dropped off the workpiece W when the probe 11A was brought into contact with the foreign matter F.

If it is assumed that there was no foreign matter when probe 11A first output a contact signal, AND circuits 122, 124 are in a condition in which they are supplied with a detecting signal in the H level and hence AND circuit 122 outputs a signal in the H level. Flipflop 129 is set by this signal in the H level so that the signal in the H level is provided from the set output terminal Q of the flipflop 129 to AND circuit 131 and also to NC main portion 151 as a forward feed command signal FS. NC main portion 151 thereby causes detector 11 to move at a low or very low speed $V_3$ in the same direction from the position P2 to which detector 11 has moved a distance equal to the servo error amount in the opposite direction in the preceding step.

During the movement of detector 11 at the speed $V_3$, when probe 11A of detector 11 reaches a position at which it is brought out of contact with the workpiece W, a detecting signal in the L level (an out-of-contact signal) is provided from signal detecting circuit 13 to inverter 132 of control portion 14 at which it is inverted to be provided to AND circuit 131. Since AND circuit 131 is then in a condition in which it is supplied with a signal in the H level from the set output terminal Q of the flipflop 129 in the set condition, it produces an output in the H level when it is supplied with a clock signal from timer circuit 125. Due to this output of the H level from AND circuit 131, gate circuit 135 is opened so that the measured value data of first storage means 152 thereupon is stored into fourth storage means 136 and simultaneously flipflop 129 is reset to its initial condition. After that, the data stored in fourth storage means 136 can be displayed, for example, on a display device or the like as the pertinent measured value.

Here, the overshoot or error δ of detector 11 within a period of time $\Delta t_2$ ($<\Delta T$) after probe 11A of detector 11 has been brought out of contact with the workpiece W to output a corresponding detecting signal and before the detecting signal is discriminated is represented by an equation:

$$\delta = V_3 \cdot \Delta t_2 \qquad (4)$$

Accordingly, if the speed $V_3$ is reduced to a low or very low speed, then the error δ can be made significantly small. Further, if it is assumed that the speed $V_2$ is a high speed employed for feeding since it is independent of the intended measurement and that the speed $V_1$ is a permissible highest speed of detector 11 since there may be some error permissible in the speed $V_1$, since the distance of movement of detector 11 at the speed $V_3$ is limited to a small range if the speed $V_3$ is a low or very low speed, it is possible to raise the efficiency of the measurement without having a bad influence on the accuracy of the measurement.

On the other hand, assume that there was a foreign matter when probe 11A first output a contact signal for discrimination at AND circuits 122, 124 and that the foreign matter has dropped off during the relative movement of probe 11A in the opposite direction by the distance corresponding to the servo error amount. In this case, probe 11A is in a position spaced from the workpiece W and hence the detection signal in the L level is provided to AND circuits 122, 124 so that AND circuit 124 outputs a signal in the H level. Flipflop 130 is set by this output from AND circuit 124 so that it provides from the set output terminal Q thereof a signal in the H level to AND circuit 133 and also to NC main portion 151 as a reverse feed command signal RS. Consequently, NC main portion 151 moves detector 11 from the position $P_2'$, to which detector 11 has been moved during the preceding moving step, in the opposite direction by the distance corresponding to the servo error amount, at the low or very low speed $V_3$ in a direction reverse to the moving direction in the preceding step or in other words, in a direction for contact with the workpiece W.

During the movement of detector 11 at the speed $V_3$, when probe 11A reaches a position P in which it is again brought into contact with the workpiece W, a detecting signal in the H level is provided from signal detecting circuit 13 to AND circuit 133. Since AND circuit 133 is then in a condition in which it is supplied with a signal in the H level from the set output terminal Q of flipflop 130 in the set condition, it provides an output in the H level each time a clock signal is applied thereto from timer circuit 125. This output in the H level from AND circuit 133 opens gate circuit 135 in a similar manner as described above so that the measured value data in first storage means 152 is stored into fourth storage means 136 and at the same time flipflop 129 is reset into the initial condition.

Thus, even in case a foreign matter is adhered to the workpiece W, the presence of such a foreign matter is discriminated when probe 11A has been moved in the opposite direction by the distance corresponding to the servo error amount and then the measurement is performed after a further movement of probe 11A in a direction for contact with the workpiece W, thereby preventing an error in measurement due to the presence of such a foreign matter. As to the measuring efficiency in this case, it depends upon the size of such a foreign matter, but taking it into consideration that such a foreign matter is of a size sufficient to adhere to the workpiece W, such a high efficiency can be attained as that in the example as described above.

It is to be noted that FIG. 7 illustrates time charts of waveforms of various signals of control portion 14 and changes in speed of detector 11 when there is no foreign matter adhering to the workpiece W while FIG. 8 illustrates time charts of waveforms of various signals of control portion 14 and changes in speed of detector 11 when there is some foreign matter or matters adhering to the workpiece W. FIG. 9 illustrates still another embodiment of the present invention, which is suitable in case that the probe 1A shown in FIG. 1 has a little amount of hysterisis.

Referring now to FIG. 1 and FIG. 9, detector 1 moves form the position $P_0$ to the workpiece W at a speed of $V_1$, and, when the probe 1A of the detector contacts with the surface of the workpiece W at the position "P", signal detecting circuit 3 generates a detecting signal and control portion 4 discriminates the detecting signal corresponding to the position "P'" after a time interval $\Delta t$. The detector 1 then stops at the position "$P_1$". Then it moves to the opposite direction at a speed $V_2$ from the position "$P_1$" to "$P_2$". When the detector 1 reaches to the position "$P_2$", it stops and, then it moves in the same direction with the first movement that is from "$P_0$" to "$P_1$" at a speed "$V_3$".

When probe 11A contacts with the surface of the workpiece W while it is moving to the workpiece W, signal detecting circuit 3 generates a detecting signal again and control portion 4 discriminates the detecting signal and control portion 4 gives the stop command signal STP to NC device 5 after a time interval $\Delta t'$ ($\Delta t' < \Delta T$). The distance "67" is the error in measuring.

In the case as shown in FIG. 9, probe 1A contacts with the surface of the workpiece W in the same posture both when it moves from "$P_0$" to "$P_1'$" and when it moves from "$P_2$" to "$P_3$". Furthermore, in FIG. 9 the distance $P_1 \cdot P_2$ is selected as follows, $$\overline{P_1 \cdot P_2} = \text{servo error } (\overline{P_1 \cdot P'}) + V_1 \cdot \Delta T + P \cdot P_2$$

where $\overline{P \cdot P_2} > 0$.

Further, in FIG. 2 to FIG. 9 mentioned above, although the third storage means stores a servo error which is supplied from the difference register, it is also possible to store a constant depending only on the speed $V_1$ instead of the servo error "SVE", which is usually a little larger than servo error "SVE".

Although the invention has been described with respect to various presently preferred embodiments, it will be apparent to those skilled in the art that modifications can be made to those embodiments without departing from the true spirit and scope of the invention.

What is claimed is:

1. A method for making measurements on a workpiece which may have a foreign substance adhered thereto and which is mounted on an apparatus of the type which includes a detector for producing a detecting signal when the detector is brought into and out of contact with the workpiece, a driving means for relatively moving the detector with respect to the workpiece; a control means for producing a signal corresponding to an amount by which the detector is moved with respect to the workpiece and for causing the driving means to stop in accordance with said detecting signal; and a position detection means for detecting the position of the detector; the method comprising the steps of:

relatively moving the detector towards the workpiece at a first speed ($V_1$) before any first contact position data from said control means;

producing a detecting signal corresponding to the contact position at which the detector contacts with the workpiece or a foreign substance during movement at the first speed;

applying a stop signal which is produced by the control means in response to a detecting signal given from the detector to the driving means;

relatively moving the detector in a reverse direction to the direction with the first speed at a second speed ($V_2$) to a position adjacent the contact position corresponding to the first detecting signal;

further relatively moving the detector in a direction approaching to the contact position at a third speed ($V_3$) smaller than the first and the second speed;

producing another detecting signal corresponding to the detector position at which the detector is brought into or out of contact with the workpiece during the movement at the third speed ($V_3$); and reading out the contents of the position detecting means when the detecting signal is produced while moving at the third speed.

2. A method for making measurements on a workpiece mounted on an apparatus of the type which includes:

a detector producing a detecting signal when the detector is brought into and out of contact with the workpiece;

a driving means for relatively moving the detector with respect to the workpiece;

a control means for producing a signal corresponding to an amount by which the detector is moved with respect to the workpiece and for causing the driving means to stop in accordance with said detecting signal; and a position detecting means for detecting the position of the detector; the method comprising the steps of:

relatively moving the detector towards the workpiece at a first speed ($V_1$) before any first contact position data from said control means;

detecting contact of said detector with the workpiece during movement at the first speed;

applying a stop signal which is produced by the control means in response to a detecting signal given from the detector to the driving means;

storing a representation of the amounts of movement by which the detector still moves and then stops after said stop signal to said driving means is produced;

relatively moving the detector in a reverse direction to the direction with the first speed at a second speed ($V_2$) for a distance dependent upon the stored representation;

further relatively moving the detector in the direction approaching to workpiece at a third speed ($V_3$) smaller than the first and the second speed;

detecting that said detector is brought out of contact with the workpiece during moving at the third speed ($V_3$); and reading out the contents of the position detecting means when the detecting signal is produced while moving at the third speed.

3. A method for measuring a workpiece which may have a foreign substance adhering thereto and which is mounted on an apparatus of the type which includes:

a detector for producing a detecting signal when the detector is brought into and out of contact with the workpiece;

a driving means for relatively moving the detector with respect to the workpiece;

a control means for producing a signal corresponding to an amount by which the detector is moved with respect to the workpiece and for causing said driving means to stop the detector in accordance with said detecting signal; and a position detecting means for detecting the position of the detector; the method comprising the steps of:

relatively moving the detector in a direction approaching the workpiece at a first speed ($V_1$) before any first contact position data from said control means;

detecting contact of said detector with the workpiece or a foreign substance while moving at the first speed;

applying a stop signal which is produced by the control means in response to a detecting signal given from the detector to the driving means;

storing a representation of the amount of movement by which the detector still moves and then stops after said stop signal to said driving means is produced;

relatively moving the detector in a reverse direction to the direction with the first speed at a second speed ($V_2$) for a distance dependent upon the stored representation;

further relatively moving the detector in a direction approaching the workpiece at a third speed ($V_3$) smaller than the first and second speed after the detector is moved a distance corresponding to the stored representation and after a detecting signal showing that the detector is brought out of contact with the workpiece is generated; then detecting contact of said detector with the workpiece while moving at the third speed;

and reading out the contents of the position detecting means when the detecting signal is produced while moving at said third speed.

4. A method as in claim 3, wherein said further relatively moving step comprises:

detecting that the detector is brought out of contact with the workpiece, while the detector moves in the reverse direction to the direction with the first speed at the second speed ($V_2$);

applying another stop signal which is produced by the control means in response to a detecting signal given from the detector to the driving means; and then relatively moving the detector in the direction approaching the workpiece and the third speed ($V_3$) smaller than the first and second speed after the detector is stopped by said stop signal applied to said driving means.

5. A method for measuring a workpiece mounted on an apparatus of the type which includes:

a detector for producing a detecting signal when the detector is brought into or out of contact with the workpiece;

a driving means for relatively moving the detector with respect to the workpiece;

a control means for producing a signal corresponding to an amount by which the detector is moved with respect to the workpiece and for causing the driving means to stop in accordance with said detecting signal, and a position detecting means for detecting the position of the detector;

the method comprising the steps of:

relatively moving the detector in a direction approaching the workpiece at a first speed ($V_1$) before any first contact position data from said control means;

detecting that the detector contacts with the workpiece while moving at the first speed ($V_1$);

applying a stop signal which is produced by the control means in response to a detecting signal given from the detector, to the driving means;

relatively moving the detector again, after the detector stops in response to said stop signal, in a reverse direction to the direction with the first speed at a second speed ($V_2$) for a distance which is larger than the distance which the detector moves and stops after said detecting signal is produced;

further relatively moving the detector in a direction approaching to the workpiece at a third speed ($V_3$) smaller than the first and second speed after the detector moves by said distance at the second speed ($V_2$);

then, detecting again when the detector is brought into contact with the workpiece while moving at the third speed ($V_3$); and reading out the contents of the position detecting means when the detecting signals is produced while moving at the third speed.

6. A method for measuring a workpiece which may have a foreign substance adhering thereto and which is mounted on an apparatus of the type which includes a detector for producing a detecting signal when the detector is brought into and out of contact with the workpiece; a driving means for relatively moving the detector with respect to the workpiece; a control means for producing a signal corresponding to an amount by which the detector is moved with respect to the workpiece and for causing said driving means to stop the detector in accordance with said detecting signal; and a position detecting means for detecting the position of the detector; the method comprising the steps of:

relatively moving the detector in a direction approaching the workpiece at a first speed ($V_1$) before any first contact position data from said control means;

detecting contact of said detector with the workpiece of a foreign substance while moving at the first speed;

applying a stop signal which is produced by the control means in response to a detecting signal given from the detector to the driving means;

storing a representation of the amount of movement by which the detector still moves and then stops after said stop signal to said driving means is produced;

relatively moving the detector in a reverse direction to the direction with the first speed at a second speed ($V_2$) for a distance dependent upon the stored representation;

detecting whether or not the detector is brought out of contact with the workpiece while moving at the second speed ($V_2$);

further relatively moving the detector at a third speed ($V_3$) smaller than the first and second speeds and in a direction dependent upon whether or not the detector was brought out of contact with the workpiece while moving at the second speed ($V_2$);

detecting that said detector is brought out of or into contact with the workpiece during moving at the third speed ($V_3$); and reading out the contents of the position detecting means when the detecting signal is produced while moving at the third speed.

7. Apparatus for measuring a workpiece, which comprises:

a detector for producing a detecting signal when the detector is brought into and out of contact with the workpiece;

driving means for relatively moving the detector with respect to the workpiece at a first speed ($V_1$) before any first contact position data from said control means;

control means for producing a signal corresponding to an amount by which the detector is moved with respect to the workpiece and for causing said driving means to stop in accordance with said detecting signal;

position detecting means for detecting the position of the detector;

said control means further including timing signal generating means which generates a timing signal with a predetermined time period;

gating means which produces a first stop signal synchronized with the timing signal from a first detecting signal generated by the detector when it contacts with the workpiece while moving at the first speed ($V_1$);

commanding means which commands the driving means so that said detector moves to a position near a contact position corresponding to the first detecting signal at a second speed ($V_2$) after the detector stops in accordance with said first stop signal, and then which commands the driving means so that the detector moves towards or away from the workpiece at a third speed ($V_3$) smaller than said first ($V_1$) and second ($V_2$) speed after reaching said position near the contact position at the second speed ($V_2$); and read out means for reading out the position of the detector when another detecting signal is provided while the detector moves at the third speed ($V_3$).

8. Apparatus for measuring a workpiece, which comprises:

a detector for producing a detecting signal when the detector is brought into and out of contact with the workpiece;

driving means for relatively moving the detector with respect to the workpiece at a first speed ($V_1$) before any first contact position data from said control means;

control means for producing a signal corresponding to an amount by which the detector is moved with respect to the workpiece and for causing said driving means to stop in accordance with said detecting signal;

position detecting means for detecting the position of the detector;

said control means further including timing signal generating means which generates a timing signal with a predetermined time period;

gating means which produces a first stop signal synchronized with the timing signal from a first detecting signal generated by the detector when it contacts with the workpiece while moving at the first speed ($V_1$);

commanding means which commands the driving means so that said detector moves to a position near a contact position corresponding to the first detecting signal at a second speed ($V_2$) after the detector stops in accordance with said first stop signal, and then which commands the driving means so that the detector moves towards the workpiece at a third speed ($V_3$) smaller than said first ($V_1$) and second ($V_2$) speeds when another detecting signal is provided, so that the detector is brought out of contact with the workpiece, before reaching said position near the contact position at the second speed;

read out means for reading out the position of the detector when still another detecting signal is provided while the detector moves towards the workpiece at the third speed ($V_3$).

9. Apparatus for measuring a workpiece as in claim 7 wherein:

said control means further includes a memory area which stores data corresponding to the differences between commanding data given by said commanding means and the position data given by said position detecting means when said stop signal is produced, said stored data being supplied to said commanding means for causing the detector to move at the second speed.

10. Apparatus for measuring a workpiece as in claim 7 wherein:

said control means comprises a computerized numerical control device which produces a command data at each time period, said each time period corresponding to the time interval of said each timing signal.

11. Apparatus for measuring a workpiece as in claim 10 wherein:

said numerical control device further includes a command register which accumulates the command data which are produced as a result of an interpolating operation in said numerical control device, a position register showing the position of the detector and a difference register which stores the difference between the contents of said command register and the contents of said position register, the contents of said difference register being supplied to the driving means.

12. Apparatus for measuring a workpiece as in claim 7 or 11 wherein:

said control means includes a memory which stores a data corresponding to the distance by which the detector moves in a direction away from the workpiece at the second speed after the detector is stopped by the first stop s ignal.

* * * * *